US006984001B2

(12) United States Patent
Nilsson

(10) Patent No.: US 6,984,001 B2
(45) Date of Patent: *Jan. 10, 2006

(54) POWER SUPPLY NETWORK FOR BRAKE SYSTEM

(75) Inventor: Peter Nilsson, Örkelljunga (SE)

(73) Assignee: Haldex Brake Products AB, (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/674,199

(22) Filed: Sep. 29, 2003

(65) Prior Publication Data

US 2005/0067888 A1    Mar. 31, 2005

(51) Int. Cl.
B60T 8/00    (2006.01)

(52) U.S. Cl. .................... 303/20; 303/122; 303/199

(58) Field of Classification Search .................. 303/20, 303/3, 15, 199, DIG. 9, 122–122.09, 155; 701/70, 80, 76, 1, 29, 31, 33, 36, 41; 188/158–165; 318/269, 370, 139; 307/9.1, 10.8, 10.1
See application file for complete search history.

(56) References Cited

U.S. PATENT DOCUMENTS

| 4,653,614 A | 3/1987 | Price et al. ................. 188/70 |
| 4,852,699 A | 8/1989 | Karnopp et al. ........... 188/72.2 |
| 4,946,007 A | 8/1990 | Pederson et al. ......... 188/24.14 |
| 4,974,704 A | 12/1990 | Miller et al. ............. 188/24.24 |
| 5,012,901 A | 5/1991 | Campbell et al. .......... 188/71.4 |
| 5,752,748 A | 5/1998 | Schramm et al. ............ 303/20 |
| 5,788,023 A | 8/1998 | Schoner et al. ............ 188/72.7 |
| 5,829,557 A | 11/1998 | Halasy-Wimmer et al. . 188/162 |
| 6,209,966 B1 | 4/2001 | Mies |
| 6,256,570 B1 | 7/2001 | Weiberle et al. ............. 701/70 |
| 6,318,513 B1 | 11/2001 | Dietrich et al. ........... 188/72.7 |
| 6,354,671 B1 | 3/2002 | Feldmann et al. ........... 303/15 |
| 6,410,993 B1 | 6/2002 | Giers ....................... 307/10.1 |
| 6,525,432 B2 * | 2/2003 | Heckmann et al. ........ 307/10.1 |
| 6,540,309 B1 | 4/2003 | Jordan et al. .......... 303/122.07 |

FOREIGN PATENT DOCUMENTS

| EP | 0832800 | 1/1994 |
| EP | 1231121 | 8/2002 |
| WO | WO 01/57647 | 8/2001 |
| WO | WO 03071150 | 8/2003 |

OTHER PUBLICATIONS

European Patent Standard Report, Jul. 2004, EPX.

* cited by examiner

Primary Examiner—Douglas C. Butler
(74) Attorney, Agent, or Firm—St. Onge Steward Johnston & Reens LLC

(57) ABSTRACT

A braking system includes at least one power supply, and first and second brake component each at least partially operated by electrical power. First and second power supply networks electrically connect the power supply with the first brake component and the second brake component respectively. An auxiliary power supply link is activatable to electrically connect the first brake component and the second brake component when a failure occurs in one of the first power supply network or the second power supply network, the auxiliary power supply link adapted to transmit the electrical power between the first brake component and the second brake component when the failure occurs.

33 Claims, 6 Drawing Sheets

POWER SUPPLY NETWORK FOR BRAKE SYSTEM

FIELD OF THE INVENTION

The present invention relates generally to an electrically controlled and/or electrically actuated braking system which is intended for use with wheeled vehicles, and more particularly to a power supply network for such a braking system which incorporates enhanced safety features.

BACKGROUND OF THE INVENTION

Traditional braking systems for motor vehicles include conventional hydraulic or pneumatic brakes associated with two or more wheels of the vehicle. Such conventional brakes are actuated by pressurized fluid or compressed air. When actuated, the brakes exert a force on a disk or drum which spins in conjunction with the wheel of the vehicle in order to create frictional forces which resist rotation of the wheel. Traditionally, control signals have been transmitted to each of the brake system's actuators mechanically, or by a hydraulic or pneumatic control circuit. However, it has more recently been proposed to employ a centralized control unit to generate electronic control signals and to use such electronic control signals to control actuation of a vehicle's brakes. This type of electronic control scheme has become even more prevalent in view of modern brake systems which now often include not only conventional hydraulic or pneumatic brake actuator functionality, but also supplemental electronic functions such as antilock protection (ABS) and/or electronic braking force distribution (EBV) between the front and rear axles.

U.S. Pat. No. 6,354,671 discloses a brake system in which electronic signals are used to at least partially control actuation of a vehicle's brakes. However, as recognized in the patent, brake system failure due to failure of the electronic control unit (for example, due to a failure in the electrical power supply) is a significant risk. As such, system redundancy is provided in the form of a back-up pneumatic control circuit. Should the electronic control unit malfunction due to failure of the electrical power supply or for some other reason, the braking system is controlled by the back-up pneumatic control circuit in much the same way as traditional brake systems operate. However, such a system suffers from a number of disadvantages. Providing a back-up pneumatic control circuit greatly complicates the braking system and increases the costs thereof. Moreover, when operating in the back-up mode, the advanced functionality of the electronic control system is lost. As such, providing a pneumatic back-up system defeats many of the advantages of providing an electronic control circuit in the first place.

U.S. Pat. No. 6,209,966 obviates some of the problems associated with providing a back-up pneumatic control circuit by employing two electronic control units, which operate independently of each other, and which provide control signals to a brake cylinder assigned to a wheel and a braking pressure modulator valve which is fluid-connected to the brake cylinder. The braking pressure modulator has a first electric actuating element, which can be activated by a first of the two control units, and a second electric actuating element which acts in the same direction when activated as the first electric actuating element. The second electric actuating element can be activated by the second electronic control unit at the same time as the first electric actuating element is being activated by the first electronic control unit. Thus, system redundancy is provided by providing two separate electronic control units, each of which controls one of two separate electric actuating elements associated with each wheel.

While U.S. Pat. No. 6,209,966 obviates some of the problems associated with providing a back-up pneumatic control circuit, it suffers from disadvantages of its own. The braking system disclosed in the '966 patent would require two separate electronic actuating elements associated with each wheel. This requirement, however, needlessly complicates and increases the cost of the system. This is true because control problems, when they arise, are generally caused by a malfunction in the control unit, the control network by which control signals are transmitted to the actuating elements and/or the power supply network or networks, not by failure of the actuating elements themselves. As such, providing two actuating elements for each wheel would not significantly enhance safety of the braking system. Moreover, because both electronic control networks (i.e., the control networks associated with each electronic control unit) and presumably the electrical power supply network or networks are directly connected to actuating elements at each wheel, it is possible for an external catastrophic event, such as a tire explosion, in the vicinity of one of the wheels to cut the control and power supply network cabling and/or cause a short-circuit in both control networks as well as the power supply network or networks, thereby causing the entire brake system to fail.

It has also been suggested to create a redundant power supply system where two separate power supply networks are employed. Such a system 100, shown in FIG. 1, employs one or more power supplies 102 provided to supply power to two or more brake assemblies 104, 106, 108, 110, 112, 114, each having a brake actuator 116 incorporating an electronic control unit 118. Power supply or supplies 102 is or are in electrical communication with the electronic control unit 118 of each of brake assemblies 104, 106, 108, 110, 112, 114 via at least two power supply networks 120, 122. As seen in FIG. 1, all of electronic control units 118 of all brake assemblies 104, 106, 108, 110, 112, 114 are connected to each power supply network 120, 122. By providing such an arrangement, should one power supply network fail, the other power supply network would theoretically supply power to all brake assemblies.

However, this arrangement suffers from disadvantages similar to those suffered by U.S. Pat. No. 6,209,966 discussed above. More specifically, because both power supply networks 120, 122 are directly electrically connected to electronic control units 118 of all brake assemblies 104, 106, 108, 110, 112, 114, it is possible for an external catastrophic event, such as a tire explosion, in the vicinity of one of the brake assemblies to cut the network cabling and/or cause a short-circuit in both power supply networks 120, 122, thereby causing the entire brake system to fail.

What is desired, therefore, is an electrically controlled and/or actuated braking system which is intended for use with wheeled vehicles, which incorporates enhanced safety features, which employs system redundancy in case of partial system failure, which is relatively uncomplicated and less costly as compared to known systems, and which is not prone to complete system failure in the case of an external catastrophic event.

SUMMARY OF THE INVENTION

Accordingly, it is an object of the present invention to provide an electrically controlled and/or actuated braking system which is intended for use with wheeled vehicles.

Another object of the present invention is to provide an electrically controlled and/or actuated braking system having the above characteristics and which incorporates enhanced safety features.

A further object of the present invention is to provide an electrically controlled and/or actuated braking system having the above characteristics and which employs system redundancy in case of partial system failure.

Still another object of the present invention is to provide an electrically controlled and/or actuated braking system having the above characteristics and which is relatively uncomplicated and less costly as compared to known systems.

Yet a further object of the present invention is to provide an electrically controlled and/or powered braking system having the above characteristics and which is not prone to complete system failure in the case of an external catastrophic event.

These and other objects of the present invention are achieved in one embodiment of by provision of a braking system including at least one power supply, the at least one power supply supplying electrical power, a first brake component at least partially operated by electrical power, and a second brake component at least partially operated by electrical power. A first power supply network electrically connects the at least one power supply and the first brake component, the first power supply network adapted to transmit the electrical power from the at least one power supply to the first brake component. A second power supply network electrically connects the at least one power supply and the second brake component, the second power supply network adapted to transmit the electrical power from the at least one power supply to the second brake component. An auxiliary power supply link is activatable to electrically connect the first brake component and the second brake component when a failure occurs in one of the first power supply network or the second power supply network, the auxiliary power supply link adapted to transmit the electrical power between the first brake component and the second brake component when the failure occurs.

In some embodiments, the auxiliary power supply link comprises a bi-directional link adapted to transmit the electrical power from the first brake component to the second brake component and from the second brake component to the first brake component, while in others the auxiliary power supply link comprises a first uni-directional link adapted to transmit the electrical power from the first brake component to the second brake component and a second uni-directional link adapted to transmit the electrical power from the second brake component to the first brake component.

In some embodiments, the at least one power supply comprises two power supplies, wherein one of the two power supplies is electrically connected to the first power supply network, and wherein another of the two power supplies is electrically connected to the second power supply network. In other embodiments, the at least one power supply comprises a single power supply, and wherein the single power supply is electrically connected to both the first power supply network and the second power supply network. In still other embodiments, the at least one power supply comprises two power supplies, and wherein each of the two power supplies is electrically connected to both the first power supply network and the second power supply network.

In some embodiments, the braking system further includes a third brake component at least partially operated by electrical power, the third brake component electrically connected to the first power supply network, and a fourth brake component at least partially operated by electrical power, the fourth brake component electrically connected to the second power supply network. In these embodiments, a second auxiliary power supply link is activatable to electrically connect the third brake component and the fourth brake component when a failure occurs in one of the first power supply network or the second power supply network, the second auxiliary power supply link adapted to transmit the electrical power between the third brake component and the fourth brake component when the failure occurs. In certain of these embodiments, the braking system further includes a fifth brake component at least partially operated by electrical power, the fifth brake component electrically connected to the first power supply network, and a sixth brake component at least partially operated by electrical power, the sixth brake component electrically connected to the second power supply network. In these embodiments, a third auxiliary power supply link is activatable to electrically connect the fifth brake component and the sixth brake component when a failure occurs in one of the first power supply network or the second power supply network, the third auxiliary power supply link adapted to transmit the electrical power between the fifth brake component and the sixth brake component when the failure occurs.

In some embodiments, each of the first brake component and the second brake component comprises a brake actuator comprising an electrical control unit operated by the electrical power supplied by the at least one power supply. In some embodiments, the first brake component and the second brake component are actuated by a power independent of the electrical power supplied by the at least one power supply and selected from the group consisting of electrical power, hydraulic power, pneumatic power and combinations of these. In other embodiments, the first brake component and the second brake component are actuated by the electrical power supplied by the at least one power supply.

In some embodiments, the first brake component and the second brake component are disposed on a common axle of a vehicle. In some embodiments, the at least one power supply further supplies electrical power to a vehicle system selected from the group consisting of an antilock brake system, an electronic braking force distribution system, a vehicle suspension system, a dynamic stability system and combinations of these. Preferably, enough electrical power to operate both the first brake component and the second brake component is transmitted over both the first power supply network and the second power supply network.

In another embodiment of the present invention, a braking system includes at least one power supply, the at least one power supply supplying electrical power, and a plurality of pairs of brake components, each of the brake components at least partially operated by the electrical power supplied by the at least one power supply. A first power supply network electrically connects the at least one power supply and a first brake component of each pair of brake components, the first power supply network adapted to transmit the electrical power from the at least one power supply to the first brake component of each pair of brake components. A second power supply network electrically connects the at least one power supply and a second brake component of each pair of brake components, the second power supply network adapted to transmit the electrical power from the at least one power supply to the second brake component of each pair of brake components. A plurality of auxiliary power supply links are activatable to electrically connect the first brake component of each pair of brake components and the second brake component of each pair of brake components when a failure occurs in one of the first power supply network or the second power supply network, the auxiliary power supply links adapted to transmit the electrical power between the first brake component of each pair of brake components and the second brake component of each pair of brake components when the failure occurs.

In some embodiments, each of the plurality of auxiliary power supply links comprises a bi-directional link adapted to transmit the electrical power from the first brake component of each pair of brake components to the second brake component of each pair of brake components and from the second brake component of each pair of brake components to the first brake component of each pair of brake components. In other embodiments, each of the plurality of auxiliary power supply links comprises a first uni-directional link adapted to transmit the electrical power from the first brake component of each pair of brake components to the second brake component of each pair of brake components and a second uni-directional link adapted to transmit the electrical power from the second brake component of each pair of brake components to the first brake component of each pair of brake components.

In some embodiments, the at least one power supply comprises two power supplies, wherein one of the two power supplies is electrically connected to the first power supply network, and wherein another of the two power supplies is electrically connected to the second power supply network. In other embodiments, the at least one power supply comprises a single power supply, and wherein the single power supply is electrically connected to both the first power supply network and the second power supply network. In still other embodiments, the at least one power supply comprises two power supplies, and wherein each of the two power supplies is electrically connected to both the first power supply network and the second power supply network.

In some embodiments, each of the brake components comprises a brake actuator comprising an electrical control unit operated by the electrical power supplied by the at least one power supply. In some embodiments, each of the brake components is actuated by a power independent of the electrical power supplied by the at least one power supply and selected from the group consisting of electrical power, hydraulic power, pneumatic power and combinations of these. In other embodiments, each of the brake components is actuated by the electrical power supplied by the at least one power supply.

In some embodiments, each pair of brake components is disposed on a common axle of a vehicle. In certain embodiments, the at least one power supply further supplies electrical power to a vehicle system selected from the group consisting of an antilock brake system, an electronic braking force distribution system, a vehicle suspension system, a dynamic stability system and combinations of these. Preferably, enough electrical power to operate all of the brake components is transmitted over both the first power supply network and the second power supply network.

In accordance with another embodiment of the present invention, a method of distributing electrical power to a brake system including at least one power supply supplying electrical power, a first brake component at least partially operated by the electrical power, and a second brake component at least partially operated by the electrical power is provided. The method comprises the steps of causing the first brake component and the second brake component to perform internal status checks, and causing the first brake component to cross-check the status of the second brake component and the second brake component to cross-check the status of the first brake component in order to determine if a failure exists. If a failure exists, it is determined, based upon one or more rules and the particular failure which exists, whether or not to activate an auxiliary power supply link activatable to electrically connect the first brake component and the second brake component. If a decision is made to activate the auxiliary power supply link, the auxiliary power supply link is activated in order to supply power to the one of the first brake component or the second brake component in connection with which the failure was determined to exist.

In some embodiments, if a failure is determined to exist and a decision is made not to activate the auxiliary power supply link, an indication is provided to a vehicle operator that a critical failure has been determined to exist. In some embodiments, if a failure is determined to exist and a decision is made to activate the auxiliary power supply link, an indication is provided to a vehicle operator that a non-critical failure has been determined to exist.

In certain embodiments, if no failure is determined to exist, communication between one or more control units and the first and second brake components is initiated and required braking functions are started to be performed. In some embodiments, if a failure is determined to exist and the auxiliary power supply link has been activated, communication between one or more control units and the first and second brake components is initiated and required braking functions are started to be performed.

In some embodiments, the causing steps and the determining step are performed at system start up. In some embodiments, the causing steps and the determining step are performed periodically or from time to time.

The invention and its particular features and advantages will become more apparent from the following detailed description considered with reference to the accompanying drawings.

DETAILED DESCRIPTION OF AN EMBODIMENT OF THE INVENTION

Figure 1:
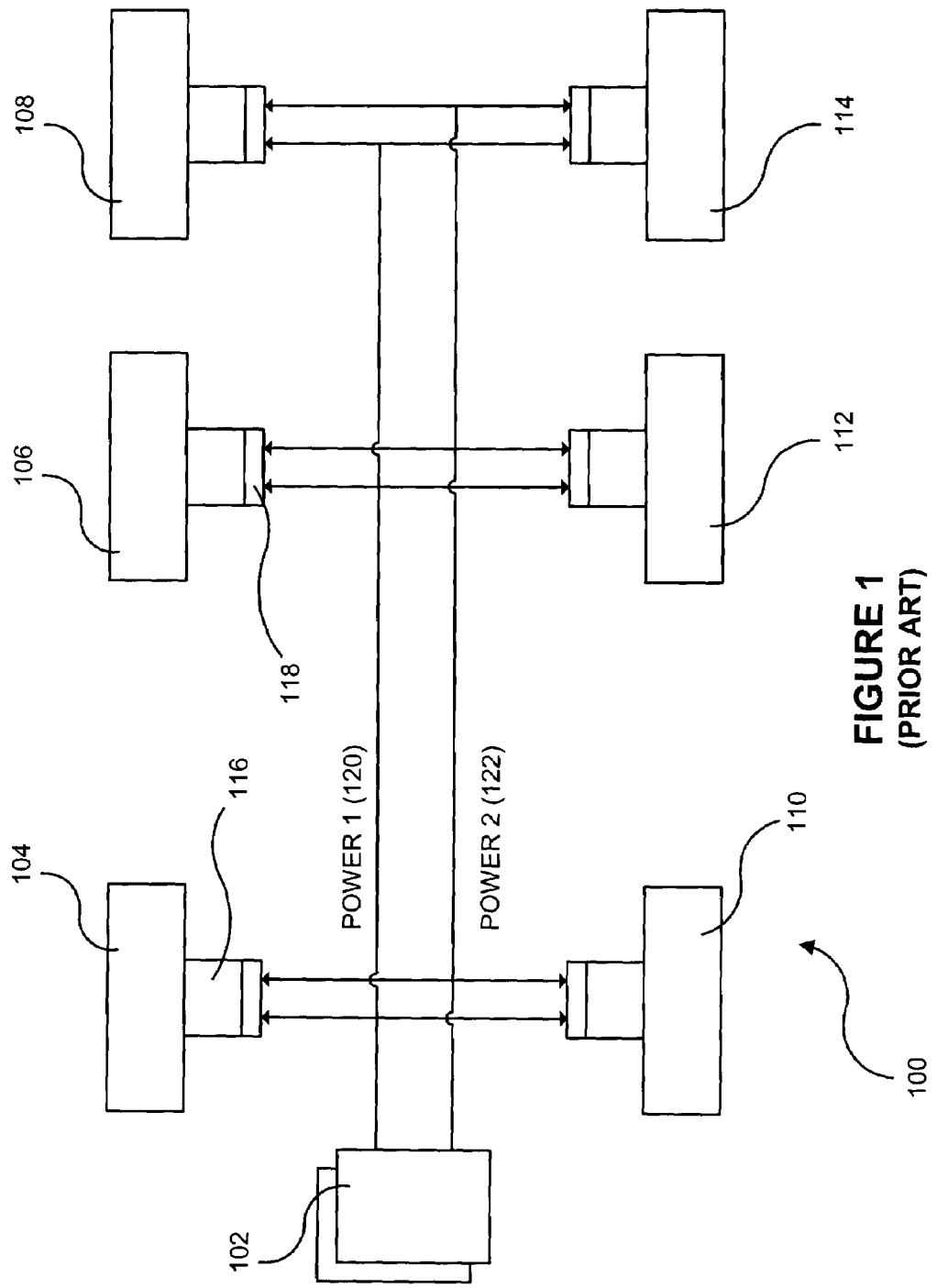
FIG. 1 is a schematic view of an electrically controlled and/or actuated braking system in accordance with a known prior art design.
Figure 2:
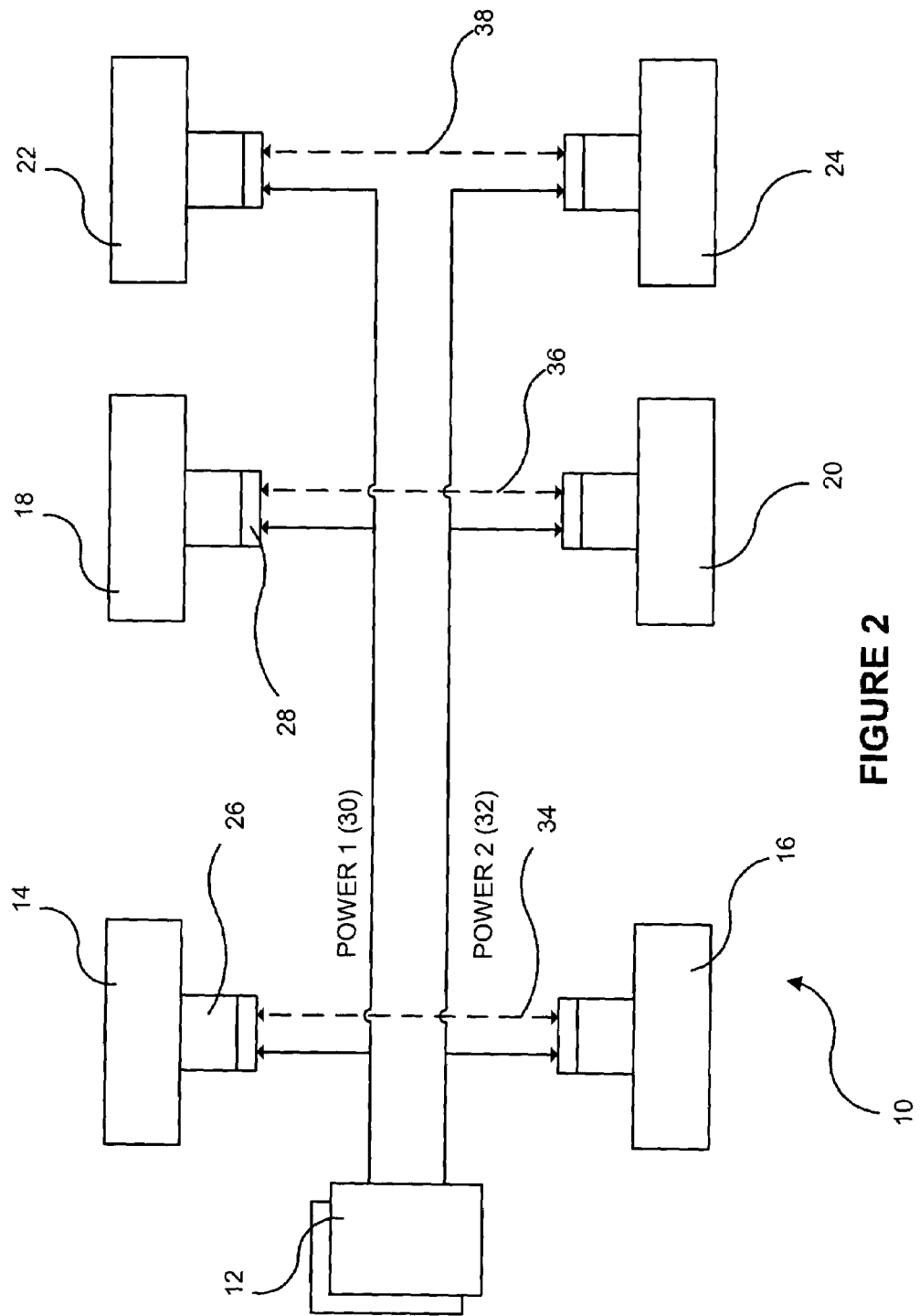
FIG. 2 is a schematic view of an electrically controlled and/or actuated braking system in accordance with an embodiment of the present invention.

Referring to FIG. 2, an electrically controlled and/or actuated braking system 10 in accordance with one embodiment of the present invention is shown. Braking system 10 includes at least one power supply 12 which generates and/or stores electrical power. Braking system 10 also includes a plurality of brake components 14, 16, 18, 20, 22, 24. While six brake components 14, 16, 18, 20, 22, 24 are shown in FIG. 2, it should be understood that braking system 10 may include a greater or lesser number of brake components. It is desirable, although not strictly necessary, that an even number of brake components are provided, and that the brake components are treated as pairs. For example, the brake components associated with the pair of wheels on each axle may be treated as a pair. In FIG. 2, first brake component 14 is paired with second brake component 16, third brake component 18 is paired with fourth brake component 20, and fifth brake component 22 is paired with sixth brake component 24.

Each of brake components 14, 16, 18, 20, 22, 24 operates on electrical power generated and/or stored by power supply or supplies 12. More particularly, each of brake components 14, 16, 18, 20, 22, 24 includes a brake actuator 26 incorporating an electronic control unit 28 which electronic control unit 28 causes brake actuator 26 to operate in response to control signals. Electronic control units 28 are supplied electrical power by power supply or supplies 12. Brake actuators 26 may comprise electromechanical brake actuators which are also supplied electrical power by power supply or supplies 12. Alternately, brake actuators 26 may be actuated by hydraulic power, pneumatic power, combinations of these, and/or by any other appropriate non-electrical power, in which case, it is not necessary to supply electrical power to brake actuators 26. As such electronically controllable and/or electrically actuatable brake components are known in the art, a detailed discussion of the operation thereof is not presented herein.

Braking system 10 includes at least two power supply networks for transmitting electrical power from power supply or supplies 12 to each of brake components 14, 16, 18, 20, 22, 24, with some of brake components 14, 16, 18, 20, 22, 24 being electrically connected to power supply or supplies 12 via one power supply network and others of brake components 14, 16, 18, 20, 22, 24 being electrically connected to power supply or supplies 12 via another or other power supply network(s). Preferably, each one of each pair of brake components is connected to a different power supply network.

In braking system 10 shown in FIG. 2, two power supply networks 30, 32 are provided. First power supply network 30 electrically connects power supply or supplies 12 with first brake component 14, third brake component 18 and fifth brake component 22 (i.e., one of each pair of brake components). First power supply network 30 is adapted to transmit electrical power from power supply or supplies 12 to first brake component 14, third brake component 18 and fifth brake component 22. Second power supply network 32 electrically connects power supply or supplies 12 with second brake component 16, fourth brake component 20 and sixth brake component 24 (i.e., the other one of each pair of brake components not electrically connected to first power supply network 30). Second power supply network 32 is adapted to transmit electrical power from power supply or supplies 12 to second brake component 16, fourth brake component 20 and sixth brake component 24.

It is desirable that no brake component is directly electrically connected to both of first power supply network 30 and second power supply network 32. This is true so as to reduce the likelihood that an external catastrophic event, such as a tire explosion, in the vicinity of one of the brake components cuts the network cabling and/or causes a short-circuit in both power supply networks 30, 32, thereby causing the entire brake system 10 to fail. For example, an external catastrophic event occurring in the vicinity of first brake component 14 may cause damage to first power supply network 30, thereby causing first power supply network 30 to be shorted and fail. However, because second power supply network 32 is not directly electrically connected to first brake component 14, such an external catastrophic event likely would not cause damage to second power supply network 32, and second power supply network 32 would still function.

Brake system 10 also includes auxiliary power supply links between each of the pairs of brake components, which auxiliary power supply links are activatable to electrically connect the pairs of brake components when a failure occurs in one of the power supply networks 30, 32, as described in more detail below. The auxiliary power supply links are adapted to transmit electrical power between each of the brake components forming each pair of brake components when such a failure occurs. In the embodiment shown in FIG. 2, three such auxiliary power supply links 34, 36, 38 are shown. First auxiliary power supply link 34 electrically connects first brake component 14 and second brake component 16, second auxiliary power supply link 36 electrically connects third brake component 18 and fourth brake component 20, and third auxiliary power supply link 38 electrically connects fifth brake component 22 and sixth brake component 24.

It should be recognized that for system 10 to properly function, enough electrical power for all brake components 14, 16, 18, 20, 22, 24 may be transmitted over both power supply networks 30, 32, not just an amount of electrical power sufficient to operate the brake components directly connected to each individual power supply network 30, 32. For example, although first brake component 14 is not directly connected to second power supply network 32, enough electrical power to operate first brake component 14 should be transmitted over second power supply network 32, so that in the event of a failure of first power supply network 30 (to which first brake component 14 is attached), electrical power may be transmitted to first brake component 14 through second power supply network 32 and second brake component 16 via first auxiliary power supply link 34. In an alternative design, a low power mode may be employed when the power supply capability is limited (i.e., when one power supply network is failing or shorted). Although such a mode may provide degraded dynamic performance, such would prevent complete system failure.

In an alternative embodiment where two independent power supplies 12 are provided, each power supply 12 may be capable of supplying half of the required power to the brake system 10 via power supply networks 30, 32. If one of the power supply networks 30, 32 is short-circuited in one brake unit, the power supplies 12 would be capable of supplying the combined power from both power supplies 12 through the still functioning power supply network 30, 32, thereby allowing the brake units to work with full dynamic capability. The two power networks 30, 32 may be mechanically separated from each other (e.g., by being disposed on different sides of the vehicle).

Thus, as discussed in the above example, suppose that an external catastrophic event occurs in the vicinity of first brake component 14 which causes damage to first power supply network 30, thereby causing first power supply network 30 to be shorted and/or fail. Because second power supply network 32 is not directly electrically connected to first brake component 14, such an external catastrophic event likely would not cause damage to second power supply network 32, and second power supply network 32 would still function. Since first brake component 14 would no longer be receiving electrical power through first power supply network 30, first auxiliary power supply link 34 would attempt to supply electrical power to first brake component 14 from second brake component 16. Of course, due to the hypothetical external catastrophic event, first brake component 14 may be damaged or destroyed and not function properly, and/or first auxiliary power supply link 34 may be damaged. Thus, first brake component 14 may not be operational. However, third brake component 18 and fifth brake component 22 are likely not damaged—they are simply no longer receiving electrical power through the failed first power supply network 30. As such, electrical power supplied to third brake component 18 and fifth brake component 22 from fourth brake component 20 and sixth brake component 24 through second auxiliary power supply link 36 and third auxiliary power supply link 38 respectively could be used to operate third brake component 18 and fifth brake component 22.

Thus, system redundancy is provided, while at the same time isolation of the power supply networks 30, 32 from one another is maintained by providing connection between brake components on different power supply networks 30, 32 by way of a buffer (i.e., auxiliary power supply links 34, 36, 38). Thus, it is extremely unlikely that both power supply networks 30, 32 will fail. At the same time, if one of them does fail, operation of at least some of the brake components on the failed power supply network can still be maintained.

In some cases, it may be desirable for two power supplies 12 to be provided. When such is the case, one of power supplies 12 may be electrically connected to first power supply network 30, while the other of power supplies 12 may be electrically connected to second power supply network 32. Alternatively, in order to maintain true redundancy (for example, if one of power supplies 12 fails), each of the two power supplies 12 may be electrically connected to both power supply networks 30, 32. In other cases, it may be desirable for a single power supply 12 to be provided, which power supply 12 may be electrically connected to both power supply networks 30, 32. Of course, in any case where power supply or supplies 12 is or are connected to both power supply networks 30, 32, it would be desirable to provide power supply or supplies 12 with safeguard measures to ensure that shorting or other failure of one power supply network 30, 32 does not short or otherwise cause a failure of the entire power supply or supplies 12.

In addition to providing electrical power to brake components 14, 16, 18, 20, 22, 24, power supply or supplies 12 may provide electrical power to various additional brake system components, such as antilock brake systems (ABS) and electronic braking force distribution (EBV) systems, as well as other vehicle systems, such as vehicle suspension and dynamic stability systems.

Figure 3:
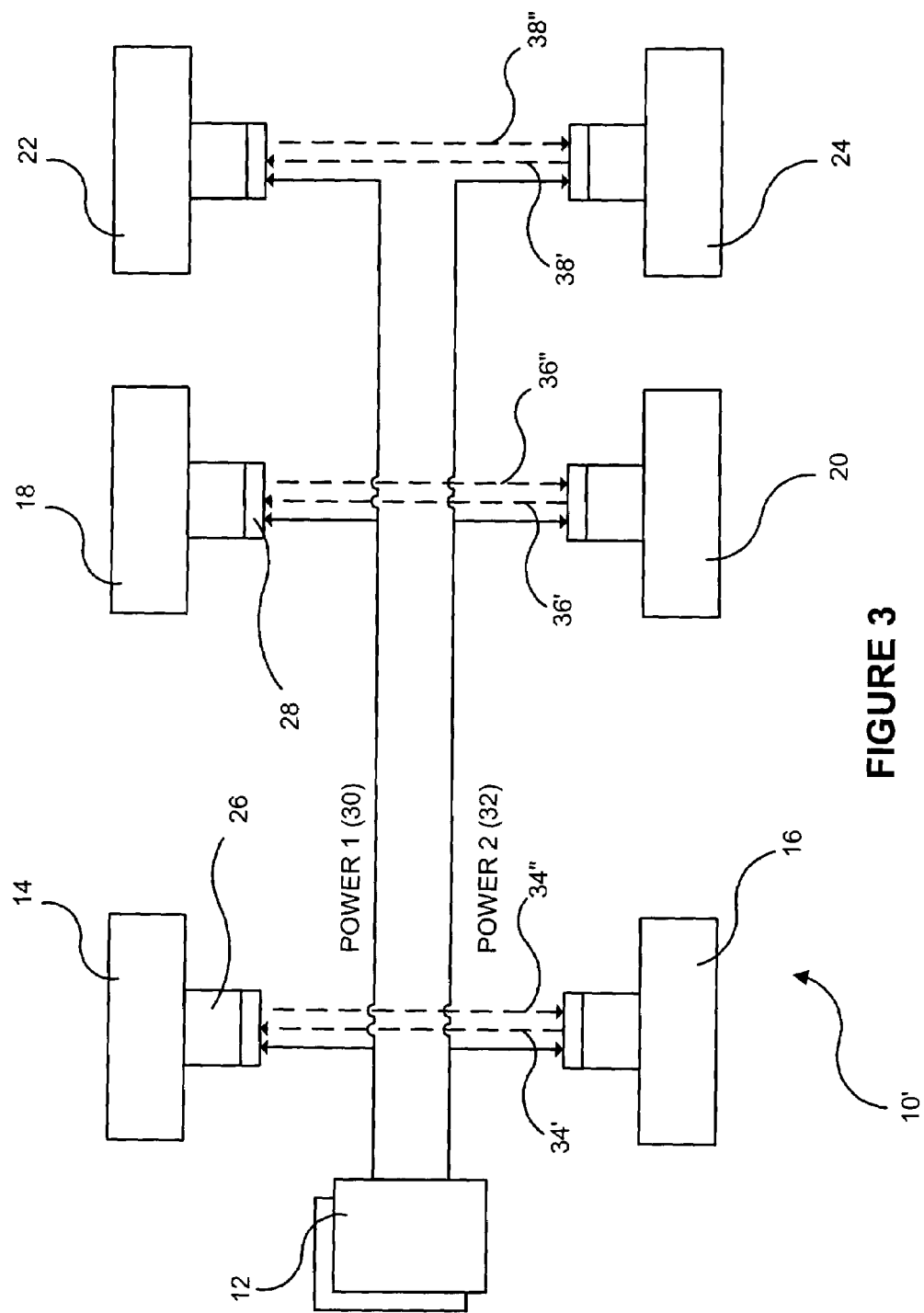
FIG. 3 is a schematic view of an electrically controlled and/or actuated braking system in accordance with another embodiment of the present invention.

Referring now to FIG. 3, an electrically controlled and/or actuated braking system 10' in accordance with another embodiment of the present invention is shown. Numerous components of system 10' are identical to components of system 10, and such components are identified with identical reference numerals. Moreover, operation of system 10' is substantially the same as operation of system 10, with one exception. While system 10 includes three bi-directional auxiliary power supply links 34, 36, 38, system 10' includes six uni-directional auxiliary power supply links 34', 34", 36', 36", 38', 38". Thus, for example, while bi-directional first auxiliary power supply link 34 of system 10 is operational to supply electrical power from first brake component 14 to second brake component 16 and from second brake component 16 to first brake component 14, system 10' includes two uni-directional auxiliary power supply links 34', 34" to accomplish the same result—auxiliary power supply link 34" for supplying electrical power from first brake component 14 to second brake component 16 and auxiliary power supply link 34' for supplying electrical power from second brake component 16 to first brake component 14. This provision of six uni-directional auxiliary power supply links 34', 34", 36', 36", 38', 38" rather than three bi-directional auxiliary power supply links 34, 36, 38 may provide enhances safety features (i.e., making short circuiting of both power supply networks 30, 32 even less likely) and/or may simplify design and operation of system components.

Figure 4:
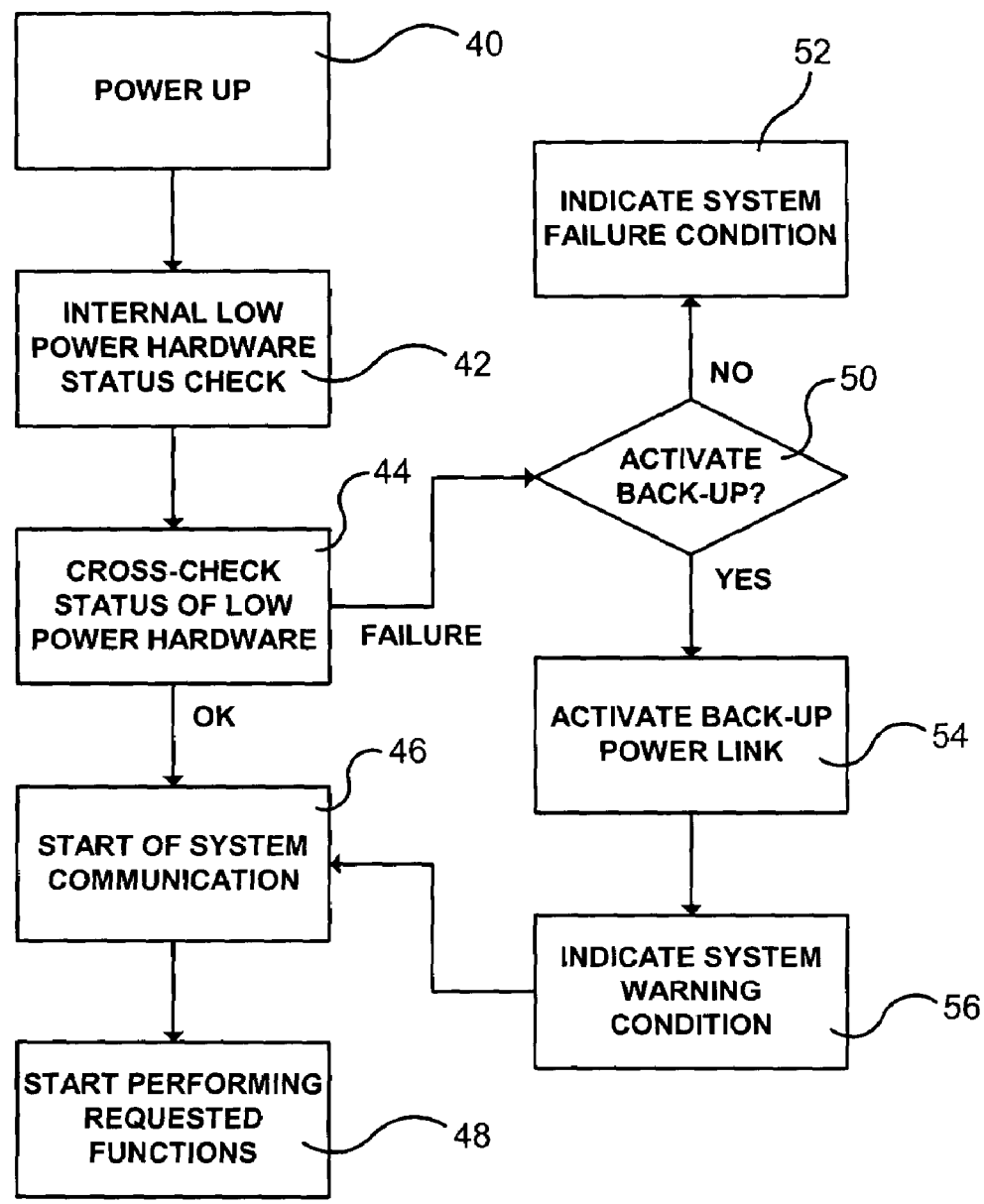
FIG. 4 is a flow chart illustrating operation of the electrically controlled and/or actuated braking systems of FIGS. 2 and 3 in accordance with an embodiment of the present invention.
Figure 5:
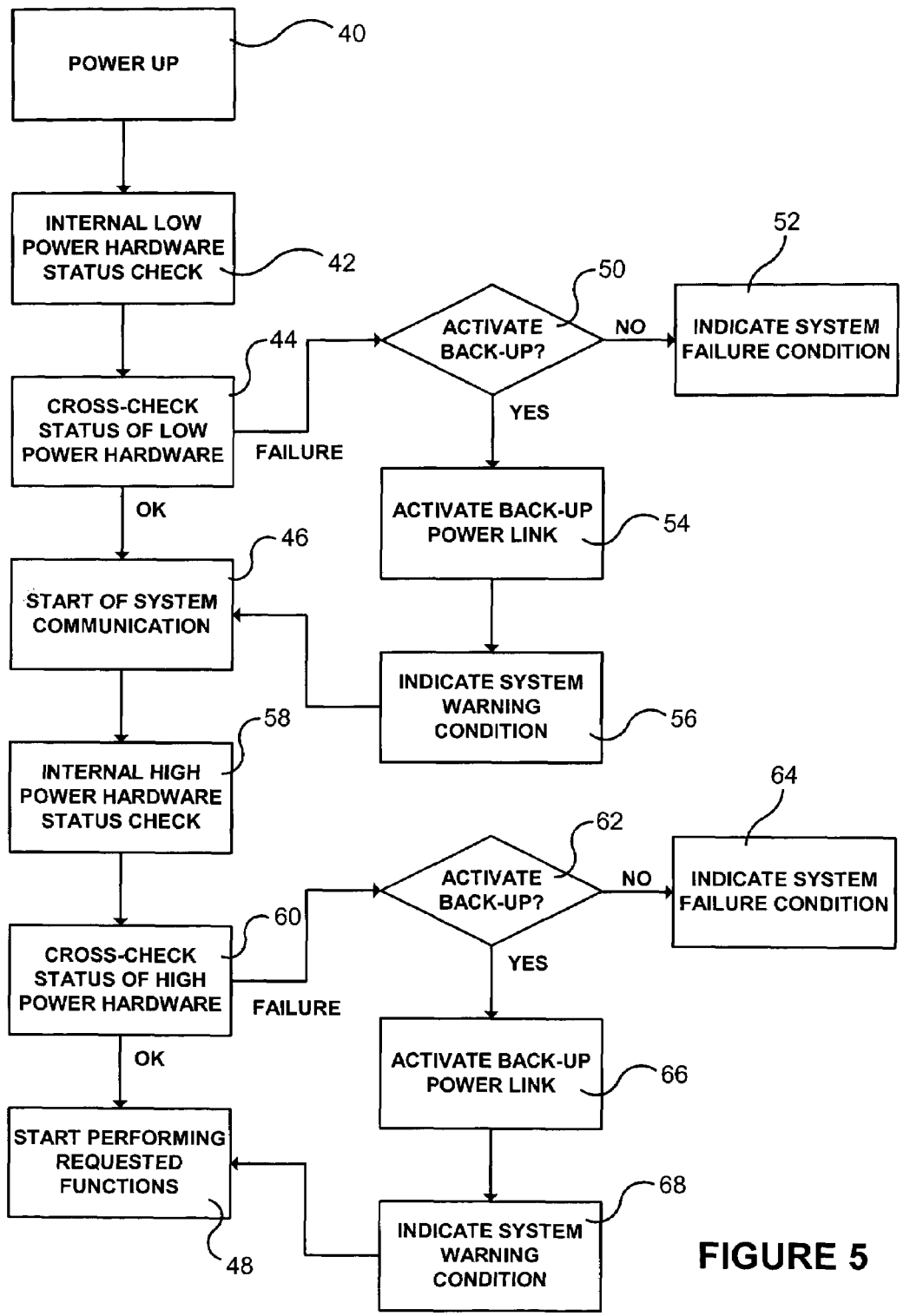
FIG. 5 is a flow chart illustrating operation of the electrically controlled and/or actuated braking systems of FIGS. 2 and 3 in accordance with another embodiment of the present invention.

Referring now to FIGS. 4 and 5, operation of systems 10, 10' are described in further detail. FIG. 4 illustrates the situation where power supply or supplies 12 are used to supply electrical power only to electronic control units 28 of brake components 14, 16, 18, 20, 22, 24. Brake actuators 26 may comprise electromechanical brake actuators which are supplied electrical power by some other source, or they may be actuated by hydraulic power, pneumatic power, combinations of these, and/or by any other appropriate non-electrical power. FIG. 5 illustrates the situation where power supply or supplies 12 are used to supply electrical power both to electronic control units 28 of brake components 14, 16, 18, 20, 22, 24 as well as to brake actuators 26, which are electromechanical brake actuators.

System 10, 10' is powered up at step 40. At step 42, an internal status check of low power hardware such as processing units, sensors, communications components, etc. (i.e., electronic control units 28) is performed by each brake component 14, 16, 18, 20, 22, 24. Next, at step 44, each brake component 14, 16, 18, 20, 22, 24 cross-checks the status of low power hardware of it's corresponding paired component (i.e., first brake component 14 cross-checks second brake component 16, second brake component 16 cross-checks first brake component 14, third brake component 18 cross-checks fourth brake component 20, etc.). If no failures are detected, system 10, 10' initiates, at step 46, communication between one or more control units (not shown) and each of brake components 14, 16, 18, 20, 22, 24, and system 10, 10' may start performing required braking functions (shown at step 48).

If one or more failures is detected at step 44, system 10, 10' decides at step 50, based upon one or more rules and the particular failure or failures detected, whether or not to activate one or more of auxiliary power supply links 34, 34', 34", 36, 36', 36", 38, 38', 38". If system 10, 10' decides not to so activate auxiliary power supply links 34, 34', 34", 36, 36', 36", 38, 38', 38" (for example, if the failure or failures are critical and operation of system 10, 10' would be dangerous), system 10, 10' provides such an indication at step 52 to the vehicle operator and operation of system 10, 10' may or may not cease. If system 10, 10' decides at step 50 to activate one or more of auxiliary power supply links 34, 34', 34", 36, 36', 36", 38, 38', 38", such is carried out at step 54. System 10, 10' may provide, at step 56, an indication of a system warning, for example alerting the vehicle operator of the failure so that servicing may be performed. Steps 46 and 48 then proceed as described above.

Referring now to FIG. 5, which illustrates the situation where power supply or supplies 12 are used to supply electrical power both to electronic control units 28 of brake components 14, 16, 18, 20, 22, 24 as well as to brake actuators 26, which are electromechanical brake actuators, operation is essentially the same as in FIG. 4 and as such the same reference numerals are used to designate the same steps. The main difference between the system operation shown in FIG. 4 and that shown in FIG. 5 is that between the step of starting system communication (step 46) and the step of starting the performance of required braking functions (step 48), a check is made of high power hardware.

More specifically, at step 58, an internal status check of high power hardware (i.e., brake actuators 26) is performed by each brake component 14, 16, 18, 20, 22, 24. Next, at step 60, each brake component 14, 16, 18, 20, 22, 24 cross-checks the status of high power hardware of it's corresponding paired component (i.e., first brake component 14 cross-checks second brake component 16, second brake component 16 cross-checks first brake component 14, third brake component 18 cross-checks fourth brake component 20, etc.). If no failures are detected, system 10, 10' may start performing required braking functions (shown at step 48).

If one or more failures is detected at step 60, system 10, 10' decides at step 62, based upon one or more rules and the particular failure or failures detected, whether or not to activate one or more of auxiliary power supply links 34, 34', 34", 36, 36', 36", 38, 38', 38". If system 10, 10' decides not to so activate auxiliary power supply links 34, 34', 34", 36, 36', 36", 38, 38', 38" (for example, if the failure or failures are critical and operation of system 10, 10' would be dangerous), system 10, 10' provides such an indication at step 64 to the vehicle operator and operation of system 10, 10' may or may not cease. If system 10, 10' decides at step 62 to activate one or more of auxiliary power supply links 34, 34', 34", 36, 36', 36", 38, 38', 38", such is carried out at step 66. System 10, 10' may provide, at step 68, an indication of a system warning, for example alerting the vehicle operator of the failure so that servicing may be performed. Step 48 then proceeds as described above.

It should be noted that the determination of whether or not a failure exists is made at steps 44 and 60 after a cross-check by a paired component. Although these steps are not strictly necessary (i.e., a determination of whether a failure exists may be made by the failing brake component itself), it is desirable that the paired brake component make such a determination due to the fact that the failure of the brake component itself may prevent that brake component from accurately diagnosing the failure.

It should also be noted that while in FIGS. 4 and 5, status checks (at steps 42, 44, 58, 60), the determination as to whether to activate auxiliary power supply links 34, 34', 34", 36, 36', 36", 38, 38', 38" (at steps 50, 62), the activation thereof (at steps 54, 66) and various other functions related thereto are shown as occurring at system power up, such steps may be performed thereafter periodically or from time to time to ensure continued system operation without failure.

Figure 6:
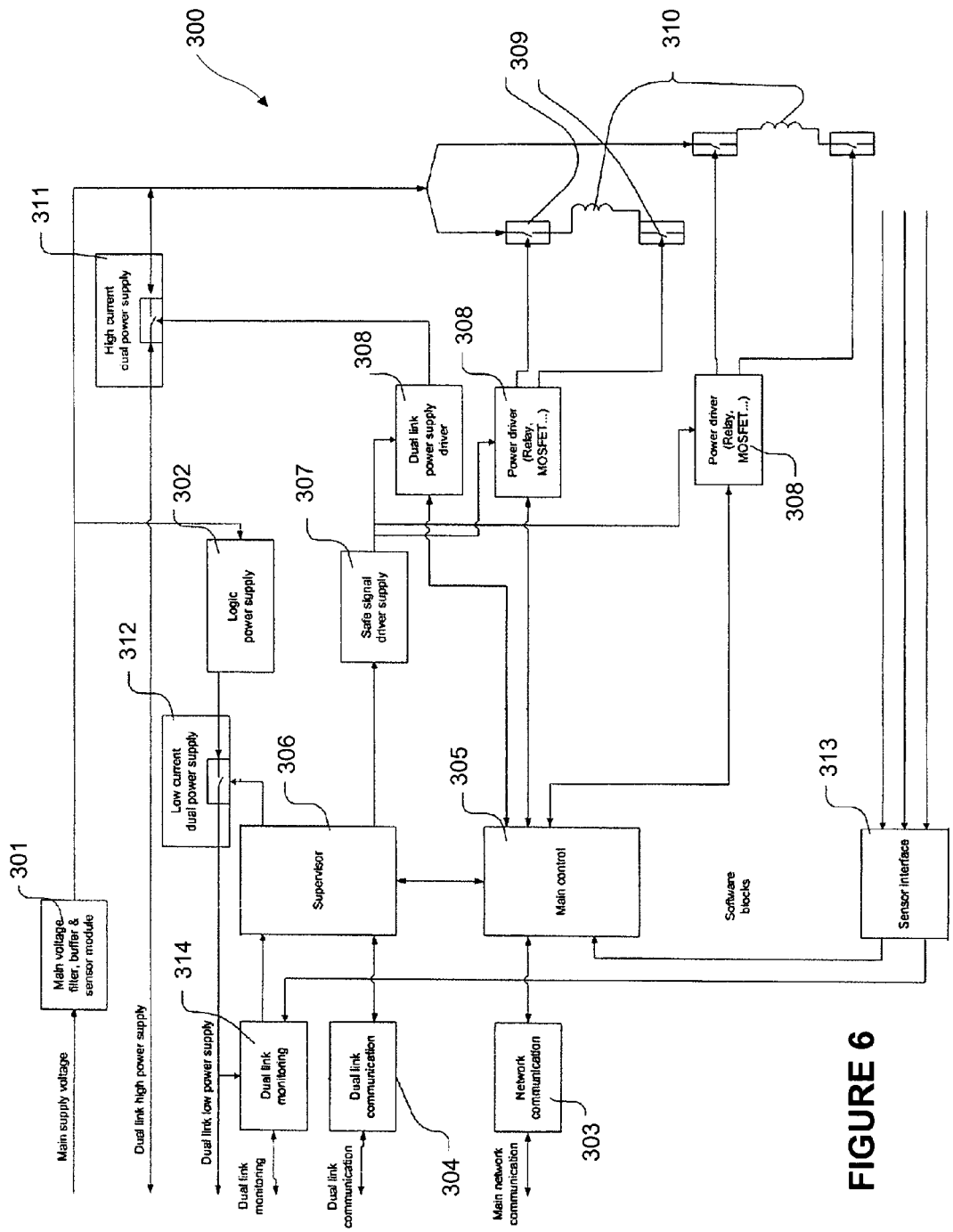
FIG. 6 is a schematic view illustrating an embodiment of how the systems shown in FIGS. 2 and 3 may be implemented.

Referring now to FIG. 6, an embodiment of how the system 10', 10" of FIGS. 2 and 3 may be implemented is shown. More specifically, a "dual link" system is based upon the concept of treating the brake components of each axle as a pair. The term "dual link" refers to the connection between the left and right side brake actuator in this pair. The dual link is applicable for power supply, digital communication and single/multiple sensor information. The design of the local electronics according to one embodiment of a dual link system 300 is shown in FIG. 6.

The dual link system 300 at a local level may provide a safe switch on function of the secondary supply voltage. Switch on (with a bi-directional switch or dual unidirectional switches) is to be determined by the software in both brake units in the axle pair. The low current dual link power supply is optional and intended to supply a redundant supply to the microcontrollers in both brake units with at least single (but preferably double) protection to avoid the risk of a common short-circuit to be catastrophic for both brake units. With this dual supply, the software in a brake unit losing primary battery supply voltage will not be disturbed and the switchover time will be short. With a hardware battery supply detection activated and monitored by the software, the switchover time will be essentially zero. The switch on of the secondary supply and of safety critical electromechanical devices shall not occur for a single fault in software or hardware. At least two switches in serial connection to each device are used to avoid one short-circuit failure destroying the switch off function. At least two independent software activations are necessary to activate any of these functions. First, the supervisor module supplies the power driver supply, through the safe signal driver supply (toggling at specified frequency), with a software generated signal. A common signal provides activations for all power drivers. For safety critical designs supervisory functions require that the supervisory (watchdog) function use a separate clock circuit. The supervisor module in this case may use the clock of the other brake unit of the axle pair as this second clock source through the dual link communication. Second, the main control module controls the power driver with a direct signal to the input pins of the power driver.

The dual link communication may also be used (1) to transfer brake system network information to the brake unit in the axle pair that has lost the connection to the brake system network, (2) to perform crosschecking of the timing (see above) and decision making for the supervisory function, (3) to transfer information regarding the power supply status of the brake units for the decision when to supply battery power across the dual link power supply, and/or (4) to transfer status information at high speed across the axle pair to be used when the communication to one brake unit is lost. This information will be helpful for the brake system to decide what actions to be taken by the other brake units when communication to a single brake unit is lost. The dual link monitoring is an optional way to determine the status of a failed brake unit from a sensor of a critical condition of the failed brake unit. The sensor could be at least one of temperature, clamping force, frictional force, brake torque, wheel speed or any other signal of great safety critical importance. The sensor will be supplied through the dual link low power supply which is necessary for this option. This option is intended to increase the possibility to continue driving a vehicle with a brake system with a failed brake unit by monitoring at least one critical condition of a failed brake unit through the dual link monitoring.

The components of system 300 are now described in more detail. Primary battery supply voltage filter, buffer and monitor module 301 provides energy buffering (e.g., by inclusion of capacitors), EMI-filtering, load current monitoring and/or load current limitation. Module 301 may also provide reverse battery protection if requested by the power supply system, although a perhaps better solution is a fixed cabling system not allowing the user to reverse the battery connection to the individual brake unit. Logic power supply module 302 supplies voltage for the internal logic and analog functions (including sensors) of system 300, supplies voltage to communication interfaces, and/or provides short-circuit protection of each output supply.

Brake system network communication module 303 provides network communication with other units in the brake system and/or with the vehicle systems, while dual link communication module 304 provides communication across the axle pair (i.e., left side actuator to right side actuator), including monitoring, crosschecking and watchdog functionality and/or transfers brake networking communication when one actuator in the pair has lost the communication to/from the brake system network.

Main control module 305 provides the main control strategy for the brake unit responding to the inputs from brake system network, dual link communication and sensor information connected to the electronic unit. Supervisor module 306 transfers information from the dual link communication module 304 to the main control module 305 and/or performs a watchdog function comparing information from the main control module 305 and the dual link communication module 304. If the watchdog function accepts the timing and information received according to the rules specified by design a software driven safe signal is sent out from the supervisor module 306. The existence of this signal is necessary to activate the power driver supply voltage from the safe signal driver supply module 307 described below. A safe signal is defined as a digital signal changing from toggling between 0 and 1 at a specified frequency.

Safe signal driver supply module 307 supplies a voltage to the power drivers 308 if and only if the safe signal from the supervisor module 306 is according to the specified frequency and timing. The supply voltage energy is supplied through an analog bandpass filter function. The safe signal driver supply voltage will supply voltage to the power drivers 308 as described below.

The power drivers 308 are the buffer drivers used to control the high power switches 309 (switches can be MOSFET transistor, relay and similar). Without a supply voltage the power drivers 308 are not able to switch on any high power switch 309. The safe signal driver supply voltage is the supply voltage to these units. The power drivers 308 are controlled by a logic signal from the main control module 305. To switch on a high power switch 309 both the on signal from the main control module 305 and the safe signal driver supply voltage is needed.

High power switches 309 are used to control electromechanical devices 310 controlling the function of the brake actuator. The status of the high power switches 309 is constantly monitored in order to detect a short-circuit failure. If the electromechanical device has a safety-critical function the winding/windings to this device are controlled by at least two high power switches (as shown in FIG. 3). This redundancy guarantees that the electromechanical device 310 is able to be switched through the high power switches 309 even if there is a single failure in a high power switch 309. The decision to switch off to a fail-safe state is taken either by the main control module 305 or the supervisor module 306 thorough the safe signal to the power driver supply module. Electromechanical devices 310 are in fail-safe condition with no current in the windings.

High current dual link power supply module 311 includes at least one of the following features: current monitoring of the current flow in the dual link high power supply; current limitation; voltage monitoring of the brake on the other side; and a high power switch of the power supply from the primary supply battery voltage to the dual link high power supply connection to the brake unit on the other side of the axle pair. The switch is normally off, and may comprise either one bidirectional switch, one uni-directional switch or two unidirectional switches (one in each direction). The decision as to when to switch on the switch/switches can be totally controlled from software, totally controlled from hardware monitoring or a combination of hardware and software decision.

Low current dual link power supply 312 includes at least one of the following features: a bi-directional switch of the power supply from the logic supply voltage to the dual link low power supply connection to the brake unit on the other side of the axle pair (which bi-directional switch is normally on); current monitoring of the current flow in the dual link low power supply; and current limitation. The dual link low power supply supplies a second source of power to at least one of the following functions in the brake unit on the other side of axle pair: the core of the main control function; the dual link interface; and, sensors and hardware signal condition to these sensors that are of importance at a loss of functionality.

Sensor interface module 313 provides hardware and/or software conditioning of sensor signals from at least one of motor position, motor velocity, clamping force, friction force, temperature, brake torque, wheel speed, tire pressure, motor and electromagnet current, etc. Dual link monitoring module 314 monitors information from the brake unit at the other side of the axle pair at a loss of functionality, including the dual link communication in that other brake unit. The information is used to determine what the brake system shall and can do to keep the vehicle safe and stable on the road in the case of a failure of a single brake unit.

The present invention, therefore, provides an electrically controlled and/or actuated braking system which is intended for use with wheeled vehicles, which incorporates enhanced safety features, which employs system redundancy in case of partial system failure, which is relatively uncomplicated and less costly as compared to known systems, and which is not prone to complete system failure in the case of an external catastrophic event.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A braking system comprising:
   at least one power supply, said at least one power supply supplying electrical power;
   a first brake component at least partially operated by electrical power;
   a second brake component at least partially operated by electrical power;
   a first power supply network electrically connecting said at least one power supply and said first brake component, said first power supply network adapted to transmit the electrical power from said at least one power supply to said first brake component;
   a second power supply network electrically connecting said at least one power supply and said second brake component, said second power supply network adapted to transmit the electrical power from said at least one power supply to said second brake component; and
   an auxiliary power supply link between said first brake component and said second brake component activatable to electrically connect said first brake component and said second brake component only when a failure occurs in one of said first power supply network or said second power supply network, said auxiliary power supply link adapted to transmit the electrical power between said first brake component and said second brake component when the failure occurs.

2. The braking system of claim 1 wherein said auxiliary power supply link comprises a bi-directional link adapted to transmit the electrical power from said first brake component to said second brake component and from said second brake component to said first brake component.

3. The braking system of claim 1 wherein said auxiliary power supply link comprises a first uni-directional link adapted to transmit the electrical power from said first brake component to said second brake component and a second uni-directional link adapted to transmit the electrical power from said second brake component to said first brake component.

4. The braking system of claim 1 wherein said at least one power supply comprises two power supplies, wherein one of said two power supplies is electrically connected to said first power supply network, and wherein another of said two power supplies is electrically connected to said second power supply network.

5. The braking system of claim 1 wherein said at least one power supply comprises a single power supply, and wherein the single power supply is electrically connected to both said first power supply network and said second power supply network.

6. The braking system of claim 1 wherein said at least one power supply comprises two power supplies, and wherein each of the two power supplies is electrically connected to both said first power supply network and said second power supply network.

7. The braking system of claim 1 further comprising:
a third brake component at least partially operated by electrical power, said third brake component electrically connected to said first power supply network;
a fourth brake component at least partially operated by electrical power, said fourth brake component electrically connected to said second power supply network; and
a second auxiliary power supply link activatable to electrically connect said third brake component and said fourth brake component when a failure occurs in one of said first power supply network or said second power supply network, said second auxiliary power supply link adapted to transmit the electrical power between said third brake component and said fourth brake component when the failure occurs.

8. The braking system of claim 7 further comprising:
a fifth brake component at least partially operated by electrical power, said fifth brake component electrically connected to said first power supply network;
a sixth brake component at least partially operated by electrical power, said sixth brake component electrically connected to said second power supply network; and
a third auxiliary power supply link activatable to electrically connect said fifth brake component and said sixth brake component when a failure occurs in one of said first power supply network or said second power supply network, said third auxiliary power supply link adapted to transmit the electrical power between said fifth brake component and said sixth brake component when the failure occurs.

9. The braking system of claim 1 wherein each of said first brake component and said second brake component comprises a brake actuator comprising an electrical control unit operated by the electrical power supplied by said at least one power supply.

10. The braking system of claim 1 wherein said first brake component and said second brake component are actuated by a power independent of the electrical power supplied by said at least one power supply and selected from the group consisting of electrical power, hydraulic power, pneumatic power and combinations of these.

11. The braking system of claim 1 wherein said first brake component and said second brake component are actuated by the electrical power supplied by said at least one power supply.

12. The braking system of claim 1 wherein said first brake component and said second brake component are disposed on a common axle of a vehicle.

13. The braking system of claim 1 wherein said at least one power supply further supplies electrical power to a vehicle system selected from the group consisting of an antilock brake system, an electronic braking force distribution system, a vehicle suspension system, a dynamic stability system and combinations of these.

14. The braking system of claim 1 wherein enough electrical power to operate both said first brake component and said second brake component is transmitted over both said first power supply network and said second power supply network.

15. A braking system comprising:
at least one power supply, said at least one power supply supplying electrical power;
a plurality of pairs of brake components, each of said brake components at least partially operated by the electrical power supplied by said at least one power supply;
a first power supply network electrically connecting said at least one power supply and a first brake component of each pair of brake components, said first power supply network adapted to transmit the electrical power from said at least one power supply to the first brake component of each pair of brake components;
a second power supply network electrically connecting said at least one power supply and a second brake component of each pair of brake components, said second power supply network adapted to transmit the electrical power from said at least one power supply to the second brake component of each pair of brake components; and
a plurality of auxiliary power supply links between the first brake component of each pair of brake components and the second brake component of each pair of brake components activatable to electrically connect the first brake component of each pair of brake components and the second brake component of each pair of brake components only when a failure occurs in one of said first power supply network or said second power supply network, said auxiliary power supply links adapted to transmit the electrical power between the first brake component of each pair of brake components and the second brake component of each pair of brake components when the failure occurs.

16. The braking system of claim 15 wherein each of said plurality of auxiliary power supply links comprises a bi-directional link adapted to transmit the electrical power from the first brake component of each pair of brake components to the second brake component of each pair of brake components and from the second brake component of each pair of brake components to the first brake component of each pair of brake components.

17. The braking system of claim 15 wherein each of said plurality of auxiliary power supply links comprises a first uni-directional link adapted to transmit the electrical power from the first brake component of each pair of brake components to the second brake component of each pair of brake components and a second uni-directional link adapted to transmit the electrical power from the second brake component of each pair of brake components to the first brake component of each pair of brake components.

18. The braking system of claim 15 wherein said at least one power supply comprises two power supplies, wherein one of said two power supplies is electrically connected to said first power supply network, and wherein another of said two power supplies is electrically connected to said second power supply network.

19. The braking system of claim 15 wherein said at least one power supply comprises a single power supply, and wherein the single power supply is electrically connected to both said first power supply network and said second power supply network.

20. The braking system of claim 15 wherein said at least one power supply comprises two power supplies, and wherein each of the two power supplies is electrically connected to both said first power supply network and said second power supply network.

21. The braking system of claim 15 wherein each of the brake components comprises a brake actuator comprising an electrical control unit operated by the electrical power supplied by said at least one power supply.

22. The braking system of claim 15 wherein each of the brake components is actuated by a power independent of the electrical power supplied by said at least one power supply and selected from the group consisting of electrical power, hydraulic power, pneumatic power and combinations of these.

23. The braking system of claim 15 wherein each of the brake components is actuated by the electrical power supplied by said at least one power supply.

24. The braking system of claim 15 wherein each pair of brake components is disposed on a common axle of a vehicle.

25. The braking system of claim 15 wherein said at least one power supply further supplies electrical power to a vehicle system selected from the group consisting of an antilock brake system, an electronic braking force distribution system, a vehicle suspension system, a dynamic stability system and combinations of these.

26. The braking system of claim 15 wherein enough electrical power to operate all of the brake components is transmitted over both said first power supply network and said second power supply network.

27. A method of distributing electrical power to a brake system including at least one power supply supplying electrical power, a first brake component at least partially operated by the electrical power, and a second brake component at least partially operated by the electrical power, said method comprising the steps of:

causing the first brake component and the second brake component to perform internal status checks;

causing the first brake component to cross-check the status of the second brake component and the second brake component to cross-check the status of the first brake component in order to determine if a failure exists; and determining, if a failure exists, based upon one or more rules and the particular failure which exists, whether or not to activate an auxiliary power supply link activatable to electrically connect the first brake component and the second brake component, and if a decision is made to activate the auxiliary power supply link, activating the auxiliary power supply link in order to supply power to the one of the first brake component or the second brake component in connection with which the failure was determined to exist.

28. The method of claim 27 further comprising the step of:

providing, if a failure is determined to exist and a decision is made not to activate the auxiliary power supply link, an indication to a vehicle operator that a critical failure has been determined to exist.

29. The method of claim 27 further comprising the step of:

providing, if a failure is determined to exist and a decision is made to activate the auxiliary power supply link, an indication to a vehicle operator that a non-critical failure has been determined to exist.

30. The method of claim 27 further comprising the step of:

initiating, if no failure is determined to exist, communication between one or more control units and the first and second brake components and starting to perform required braking functions.

31. The method of claim 27 further comprising the step of:

initiating, if a failure is determined to exist and the auxiliary power supply link has been activated, communication between one or more control units and the first and second brake components and starting to perform required braking functions.

32. The method of claim 27 wherein said causing steps and said determining step are performed at system start up.

33. The method of claim 27 wherein said causing steps and said determining step are performed periodically or from time to time.

* * * * *